(12) United States Patent
Adams et al.

(10) Patent No.: US 9,092,463 B2
(45) Date of Patent: Jul. 28, 2015

(54) KEYWORD GENERATION

(71) Applicant: Google Inc., Mountain View, CA (US)

(72) Inventors: David Adams, Burlingame, CA (US);
Beverly Yang, San Francisco, CA (US);
Gaurav Garg, San Francisco, CA (US);
Everett Wetchler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 13/760,972

(22) Filed: Feb. 6, 2013

(65) Prior Publication Data

US 2014/0101163 A1 Apr. 10, 2014

Related U.S. Application Data

(60) Provisional application No. 61/710,370, filed on Oct. 5, 2012.

(51) Int. Cl.
*G06F 17/30* (2006.01)
(52) U.S. Cl.
CPC .... *G06F 17/30286* (2013.01); *G06F 17/30864* (2013.01)
(58) Field of Classification Search
CPC ............... G06F 17/30286; G06F 17/30864
USPC ........................................ 707/748, 751, 740
See application file for complete search history.

(56) References Cited

U.S. PATENT DOCUMENTS

| | | | |
|---|---|---|---|
| 2004/0267725 A1 | 12/2004 | Harik | |
| 2005/0222901 A1 | 10/2005 | Agarwal et al. | |
| 2006/0265399 A1* | 11/2006 | De Filippi | 707/10 |
| 2008/0016040 A1 | 1/2008 | Jones et al. | |
| 2010/0198695 A1 | 8/2010 | Muthukrishnan et al. | |
| 2012/0254185 A1* | 10/2012 | White et al. | 707/740 |

OTHER PUBLICATIONS

Abhishek, "Keyword Generation for Search Engine Advertising using Semantic Similarity between Terms," In: Proceedings of the ninth International Conference on Electronic Commerce (ICEC '07), Canada. May 2007, 89-94.

(Continued)

*Primary Examiner* — Jorge A Casanova
(74) *Attorney, Agent, or Firm* — Fish & Richardson P.C.

(57) ABSTRACT

This specification describes technologies relating to generation of keywords. In general, one aspect of the subject matter described in this specification can be embodied in methods that include receiving structured data describing a content item, the structured data indicating a category for the content item. The methods may further include searching domains associated with the category using a first query, formed based on data elements in the structured data, to identify resources associated with the identified domains. The methods may further include determining one or more queries based on data reflecting past search queries, where each of the one or more determined queries resulted in one or more of the identified resources being returned as part of a search result, and determining keywords based on the one or more determined queries. The methods may further include transmitting or storing the keywords for use in impression allocation decisions.

17 Claims, 5 Drawing Sheets

(56) References Cited

OTHER PUBLICATIONS

Joshi et al., "Keyword Generation for Search Engine Advertising," In: Sixth IEEE International Conference on Data Mining (ICDM) Workshops, Hong Kong, Dec. 2006, Retrieved from http://xenon.stanford.edu/~amrutaj/work/papers/termsNet.pdf, 3 pages.

International Search Report and Written Opinion in International Application No. PCT/US2013/063393, mailed on Jan. 28, 2014, 10 pages.

International Preliminary Report on Patentability in International Application No. PCT/US2013/063393, mailed Apr. 16, 2015, 6 pages.

* cited by examiner

KEYWORD GENERATION

CROSS-REFERENCE TO RELATED APPLICATION

Priority is hereby claimed to U.S. Provisional Application No. 61/710,370, which was filed on Oct. 5, 2012. The contents of U.S. Provisional Application No. 61/710,370 are hereby incorporated by reference into this disclosure.

TECHNICAL FIELD

The present disclosure relates to the selection and display of online content.

BACKGROUND

The Internet provides access to a wide variety of resources. For example, video and/or audio files, as well as web pages for particular subjects or particular news articles, are accessible over the Internet. Access to these resources presents opportunities for content (e.g., advertisements) to be provided with the resources. The pairing of content with requested resources can generate value. For example, a web page can include content slots in which advertisements or other content can be presented. These content slots can be defined in the web page or defined for presentation with a web page, for example, in a pop-up window.

SUMMARY

This specification describes technologies relating to generating keywords for a content item that may be used to facilitate selection of content items for presentation. In general, one aspect of the subject matter described in this specification can be embodied in a method that includes receiving structured data describing a content item, the structured data indicating a category for the content item. The method may further include retrieving stored data for the category, the stored data identifying one or more domains. The method may further include forming a first query based on data elements in the structured data and searching one or more of the identified domains using the first query to identify resources associated with the identified domains. The method may further include determining one or more queries based on data reflecting past search queries, where each of the one or more determined queries resulted in one or more of the identified resources being returned as part of a search result. The method may further include determining keywords based on the one or more determined queries. The method may further include transmitting or storing the keywords for use in impression allocation decisions In general, one aspect of the subject matter described in this specification can be embodied in a system that includes one or more data processing apparatus and a memory coupled to the one or more data processing apparatus. The memory having instructions stored thereon which, when executed by the one or more data processing apparatus cause the one or more data processing apparatus to perform operations including receiving structured data describing a content item, the structured data indicating a category for the content item. The operations may further include retrieving stored data for the category, the stored data identifying one or more domains. The operations may further include forming a first query based on data elements in the structured data and searching one or more of the identified domains using the first query to identify resources associated with the identified domains. The operations may further include determining one or more queries based on data reflecting past search queries, where each of the one or more determined queries resulted in one or more of the identified resources being returned as part of a search result. The operations may further include determining keywords based on the one or more determined queries. The operations may further include transmitting or storing the keywords for use in impression allocation decisions.

In general, one aspect of the subject matter described in this specification can be embodied in a system that includes a network interface configured to receive structured data describing a content item, the structured data indicating a category for the content item. The system may further include a data storage device storing stored data for the category, the stored data identifying one or more domains. The system may further include a module configured to form a first query based on data elements in the structured data. The system may further include a module configured to search one or more of the identified domains using the first query to identify resources associated with the identified domains. The system may further include a means for determining one or more queries based on data reflecting past search queries, where each of the one or more determined queries resulted in one or more of the identified resources being returned as part of a search result. The system may further include a module configured to determine keywords based on the one or more determined queries.

In general, one aspect of the subject matter described in this specification can be embodied in a non-transient computer readable media storing software including instructions executable by a processing device that upon such execution cause the processing device to perform operations that include receiving structured data describing a content item, the structured data indicating a category for the content item. The operations may further include retrieving stored data for the category, the stored data identifying one or more domains. The operations may further include forming a first query based on data elements in the structured data and searching one or more of the identified domains using the first query to identify resources associated with the identified domains. The operations may further include determining one or more queries based on data reflecting past search queries, where each of the one or more determined queries resulted in one or more of the identified resources being returned as part of a search result. The operations may further include determining keywords based on the one or more determined queries. The operations may further include transmitting or storing the keywords for use in impression allocation decisions.

In general, one aspect of the subject matter described in this specification can be embodied in a method that includes receiving structured data describing a content item, the structured data indicating a category for the content item. The method may further include retrieving stored data for the category, the stored data identifying one or more relationship types for topics in the category that connect those topics to related topics. The method may further include forming a first query based on data elements in the structured data and searching a relational database using the first query to identify a record. The method may further include identifying related records in the relational database, where the related records reflect topics that are related to a topic reflected by the identified record according to a relationship of type matching a relationship type from the one or more relationship types stored for the category. The method may further include determining keywords based on data elements in the related records. The method may further include transmitting or storing the keywords for use in impression allocation decisions.

In general, one aspect of the subject matter described in this specification can be embodied in a system that includes one or more data processing apparatus and a memory coupled to the one or more data processing apparatus. The memory having instructions stored thereon which, when executed by the one or more data processing apparatus cause the one or more data processing apparatus to perform operations including receiving structured data describing a content item, the structured data indicating a category for the content item. The operations may further include retrieving stored data for the category, the stored data identifying one or more relationship types for topics in the category that connect those topics to related topics. The operations may further include forming a first query based on data elements in the structured data and searching a relational database using the first query to identify a record. The operations may further include identifying related records in the relational database, where the related records reflect topics that are related to a topic reflected by the identified record according to a relationship of type matching a relationship type from the one or more relationship types stored for the category. The operations may further include determining keywords based on data elements in the related records. The operations may further include transmitting or storing the keywords for use in impression allocation decisions.

In general, one aspect of the subject matter described in this specification can be embodied in a system that includes a network interface configured to receive structured data describing a content item, the structured data indicating a category for the content item. The system may further include a data storage device storing stored data for the category, the stored data identifying one or more relationship types for topics in the category that connect those topics to related topics. The system may further include a module configured to form a first query based on data elements in the structured data. The system may further include a module configured to search a relational database using the first query to identify a record. The system may further include a means for identifying related records in the relational database, where the related records reflect topics that are related to a topic reflected by the identified record according to a relationship of type matching a relationship type from the one or more relationship types stored for the category. The system may further include a module configured to determine keywords based on data elements in the related records.

In general, one aspect of the subject matter described in this specification can be embodied in a non-transient computer readable media storing software including instructions executable by a processing device that upon such execution cause the processing device to perform operations that include receiving structured data describing a content item, the structured data indicating a category for the content item. The operations may further include retrieving stored data for the category, the stored data identifying one or more relationship types for topics in the category that connect those topics to related topics. The operations may further include forming a first query based on data elements in the structured data and searching a relational database using the first query to identify a record. The operations may further include identifying related records in the relational database, where the related records reflect topics that are related to a topic reflected by the identified record according to a relationship of type matching a relationship type from the one or more relationship types stored for the category. The operations may further include determining keywords based on data elements in the related records. The operations may further include transmitting or storing the keywords for use in impression allocation decisions.

These and other embodiments can each optionally include one or more of the following features. An allocation score for the content item may be determined based at least in part on comparison of the keywords to a term associated with a request for an impression, where the allocation score is used to determine whether the content item will be selected for the impression. The content item may be selected for display in response to the request, based on the allocation score. Data specifying the content item may be transmitted in response to the request. The user request may be associated with a user search query. A subset of the identified resources may be selected based on a URL filter stored in the stored data for the category. The identified resources may each be assigned a score and only resources with scores better than a threshold score are used to determine the one or more queries. The set of resources used may be limited so that at most one resource from each domain in the one or more identified domains is used to determine the one or more queries. Determining the one or more queries may include retrieving search data reflecting user search queries that were submitted within a widow of time and corresponding search results for those queries; determining a count of the search results corresponding to a query that includes one of the identified resources; and selecting the query for inclusion in the one or more queries based on the count. It may be that only search results that include one of the identified resources in the top N links within the search result are counted, where N is a stored parameter set to an integer value. Determining the keywords may include appending terms from the stored data for the category to a query from the one or more queries. The category may relate to movies. The category may relate to video games. The identified resources may be webpages. The search with the first query may return a list of one or more records sorted based on relevance scores and the identified record may be a record with the highest relevance score. Additional related records in the relational database may be identified, where the related records reflect topics that are related to a topic reflected by one or more additional identified records, from a list of one or more records determined with the first query, according to a relationship of type matching a relationship type from the one or more relationship types stored for the category. Identifying related records in the relational database may include identifying one or more data elements in the identified record that point to other records that relate to the identified record in accordance with the relationship and determining a relevance score for a data element in the one or more identified data elements. Determining the relevance score for the data element may include determining a number of webpages in which terms from the structured data for the content item co-occur with terms from the record pointed to by the data element. Determining the relevance score may include determining a number of related search queries in which terms from the structured data for the content item co-occur with terms from the record pointed to by the data element. Determining the keywords may include appending terms from the stored data for the category to a data element from one of the related records. A topic reflected by the identified record may be a movie and a topic reflected by one of the related records may be an actor who appeared in the movie.

Particular embodiments of the subject matter described in this disclosure can be implemented to realize none, one or more of the following advantages. Some implementations may generate relevant keywords for a content item. Some implementations may leverage knowledge of a vertical to identify the most relevant information for a content item in the vertical efficiently. Some implementations may facilitate selection of a relevant content item for presentation to a user.

The details of one or more embodiments of the subject matter described in this disclosure are set forth in the accompanying drawings and the description below. Other features, aspects, and advantages of the invention will become apparent from the description, the drawings, and the claims.

DETAILED DESCRIPTION

Figure 1:
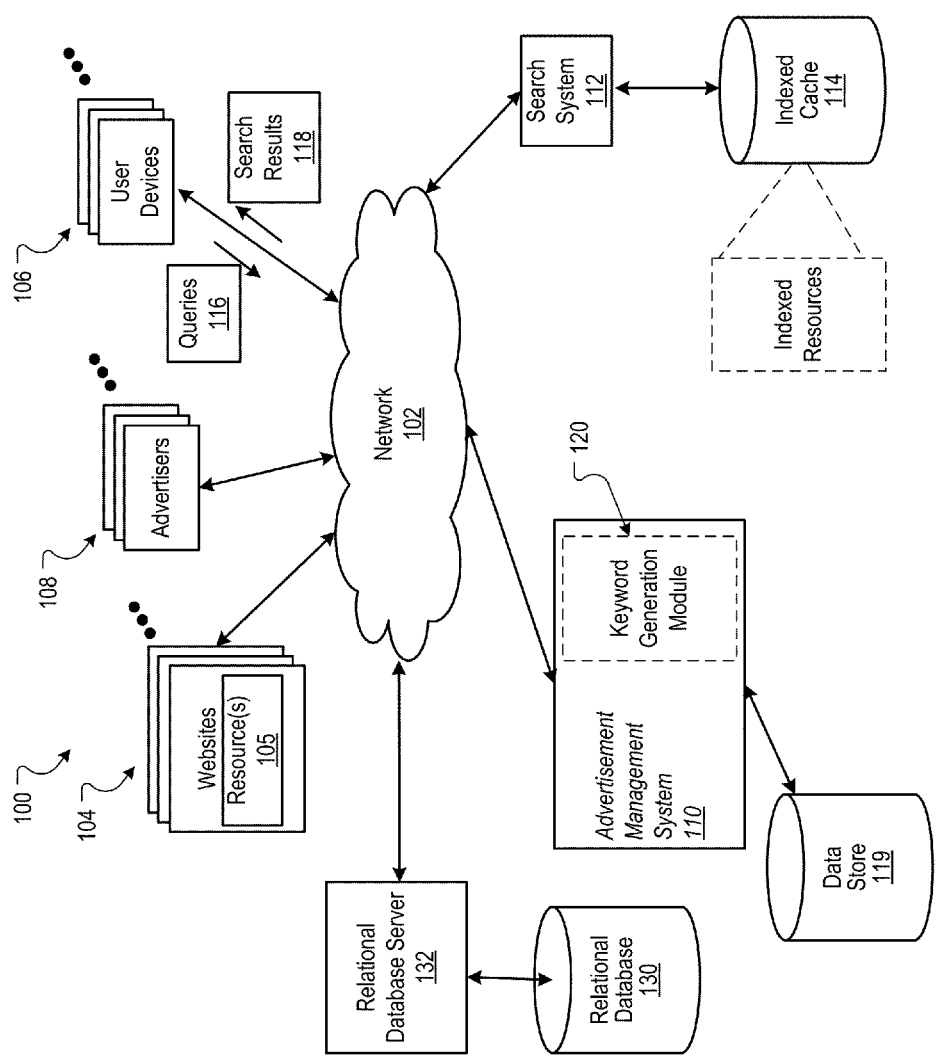
FIG. 1 is a block diagram of an example online environment.

A content item is any data that can be provided over an electronic communications network. For example, an advertisement, including a link to a landing page is a content item. A content item may include a visual component that may be displayed to users. A visual component of a content item is sometimes called a creative. A content item may also include or be associated with structured data that describes properties of the content item but is not necessarily or usually displayed to an end user. In some implementations, structured data for a content item may include one more data elements that may consist of a description paired with one or more values for the data element. For example, structured data for an advertisement for a movie may include the data elements:

[Title: "Funny Story";
Release Year: 2013;
Actor(s): "Tom Hathaway", "Christian Hardy", "Anne Bale"]

A content item may reflect one or more topics. For example, an advertisement for a movie titled "Funny Story" and scheduled for release in 2013 may be said to reflect that movie as a topic. The advertisement may include a creative depicting characters or a scene from the movie and it may include a link to a theater ticket vendor website where tickets to the movie may be purchased. Similarly, a webpage or database record may reflect a topic (e.g., "Funny Story" or an actor in the movie) by including data (e.g., data fields, text, images or other media) concerning the topic.

A vertical is a category of topics that may be reflected by content items. Examples of verticals include movies, television shows, video games, automobiles, appliances, computers, and electronics, among others. In some implementations, content items may be classified or labeled as members of a vertical by an entity that creates or distributes the content item (e.g., an advertiser) in order to facilitate the association of the content item with relevant online resources.

Pairing of relevant content items (e.g., advertisements) with online resources can provide benefits to all parties, including users advertisers and resource publishers. One way relevant content items may be identified for a requested resource is to compare keywords associated with the content item to terms associated with the resource (e.g., terms occurring in a requested webpage or terms from search query requesting a search result).

In some implementations, keywords for a content item are generated based on structured data for the content item that includes an indication of a vertical for the content item. Stored data for the vertical may be used to focus a search for relevant keywords on data sources that are likely to contain the most relevant information about a topic (e.g., a movie, a television show, a video game, or some other product) reflected in the content item. For example, a search of webpages may be narrowed to particular domains expected to have highly relevant information for the particular vertical (e.g., a video game review website for video games). In some implementations, a relational database is searched for data related to the topic reflected in the content item using topic relationship types specific to the particular vertical (e.g., actors who appear in a movie for a movies vertical). The relevancy of terms occurring in the narrowed set of data sources is evaluated and the most relevant terms are selected and used to generate keywords for the content item. In this manner, highly relevant keywords may be generated efficiently.

The generated keywords are then stored or transmitted for use in future impression allocation decisions. When the keywords for a content item match the terms associated with an impression well, a high allocation score is determined, increasing the odds that the impression will be allocated to the content item. When the content item is selected, data specifying the content item is transmitted to facilitate the presentation of the content item to a user in the impression.

FIG. 1 is a block diagram of an example online environment 100 in which a content management system (e.g. advertisement management system 110) manages content delivery services. The example environment 100 includes a network 102, e.g., a local area network (LAN), wide area network (WAN), the Internet, or a combination thereof. The network 102 connects websites 104, user devices 106, content providers (e.g., advertisers 108), and the advertisement management system 110. The example environment 100 may include many thousands of websites 104, user devices 106, and advertisers 108.

A website 104 includes one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few examples. The resources can include content, e.g., words, phrases, images and sounds that may include embedded information (e.g., meta-information in hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application (e.g., a web browser) to facilitate the sending and receiving of data over the network 102 and the presentation of content to a user.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements or other content can be presented. These specified portions of the resource or user display are referred to as advertisement slots or impressions.

To facilitate searching of these resources, the environment can include a search system 112 that identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements or other content can be presented.

When a resource 105 or search results 118 are requested by a user device 106, the advertisement management system 110 receives a request for additional content (e.g., advertisements) to be provided with the resource 105 or search results 118. The request for advertisements can include characteristics of the advertisement slots that are defined for the requested resource or search results page, and these requests are provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords associated with a requested resource (resource keywords) or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the request (eligible advertisements). For example, eligible advertisements can include advertisements having characteristics matching the characteristics of advertisement slots and that are identified as relevant to specified resource keywords or search queries 116.

The advertisement management system 110 can select from the eligible advertisements that are provided for presentation in advertisement slots of a resource or search results page based on results of an auction. For example, the advertisement management system 110 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a conversion following selection of the advertisement. The highest bidders can be determined based on the bids alone, or based on the bids of each bidder being multiplied by one or more factors (e.g., quality scores derived from advertisement performance, landing page scores, and the like).

A conversion occurs when a user performs a particular action related to an advertisement provided with a resource or search results page. What constitutes a conversion may vary from case to case and can be determined in a variety of ways. For example, a conversion may occur when a user clicks on an advertisement and is referred to a landing page. Another conversion may occur when a user consummates a purchase before leaving that landing page. A conversion can also be defined by an advertiser to be any measurable/observable user action. User actions may include, for example, downloading a white paper, navigating to at least a given depth of a website, viewing at least a certain number of web pages, spending at least a predetermined amount of time on a website or web page, registering on a website, etc. Other actions that constitute a conversion can also be used.

The advertisement management system may store and access data regarding past allocations of content items and user interactions in a data store 119. The data store 119 is a data store that stores data representing previous user interactions with publisher websites and advertisements. For example, in response to receiving a request for an advertisement, the advertisement management system 110 can store data identifying the website to which the request corresponds and identifying the request as an impression for the website. Additionally, the advertisement management system 110 can store data representing the advertisements that were provided in response to the request and any user actions (e.g., click throughs or conversions) that are detected following presentation of the advertisements. The data store 119 may also store user session logs.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The advertisement management system 110 may also include a keyword generation module 120. The keyword generation module 120 may receive structured data describing content items from content providers (e.g., advertisers 108)

through a server system interface component of the advertisement management system 110. This structured data may be stored in the data store 119. The keyword generation module 120 may further retrieve stored data for verticals that content items are identified with as indicated in their respective structured data. For example, the stored data for the verticals may be retrieved from the data store 119 or from a remote storage device through a server system interface component of the advertisement management system 110.

When structured data for a new content item is received, the keyword generation module 120 may utilize the stored data (e.g., a list of domains associated with the vertical or a list of object relationships associated with the vertical) for the vertical specified for the content item to perform a relevancy analysis and determine keywords for the new content item. In some implementations, the keywords for the new content item are based on common search queries that hit webpages in preferred domains that are closely related to a subject of the content item. In some implementations, the keywords for the new content item are based on data describing topics that are closely related to a topic of the content item in particular ways associated with the vertical of the content item. For example, a relational database 130 may store information on a wide variety of topics and the relationships between those topics. The keyword generation module 120 may access the relational database 130 through a relational database server 132 that implements a search engine that may be used to search the relational data base for relevant records and records related to those relevant records. Data from the related records may then be used for keyword generation.

In some implementations, the determined keywords may be stored in data store 119 in a record associated with the structured data for the content item. In some implementations, the determined keywords may be transmitted to a remote device (e.g., an advertiser 108 device) through a server system interface component of the advertisement management system 110. In some implementations, the determined keywords may be used by the advertisement management system 110 to allocate impressions to the content item resulting in a transmission of data specifying the content item in response to a user request for content. For example, the data specifying the content item may be transmitted through a server system interface component of the advertisement management system 110.

Figure 5:
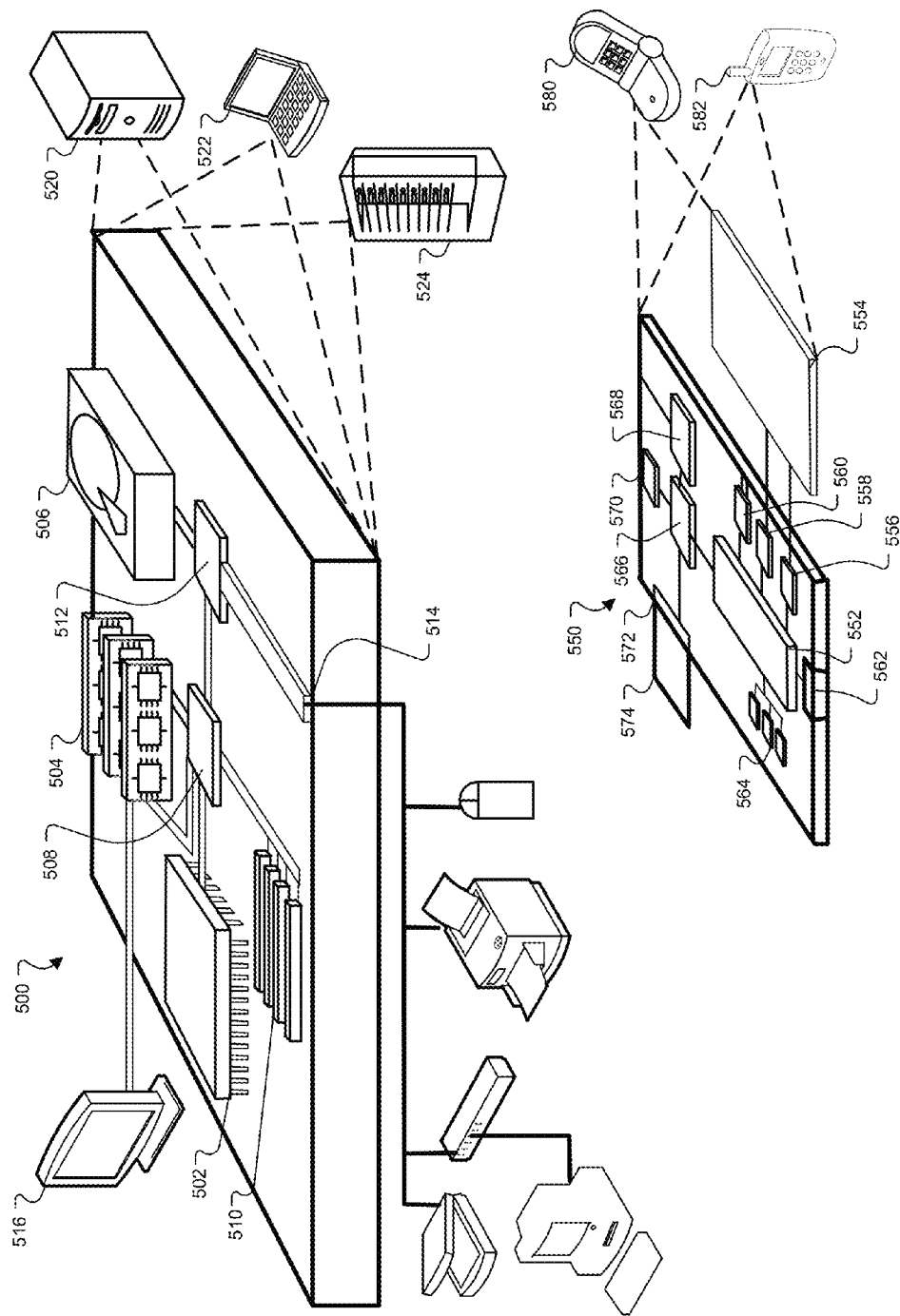
FIG. 5 shows an example of a computer device and a mobile computer device that can be used to implement the techniques described here.

The advertising management system 110 may be implemented as software that is executed on a processing apparatus, e.g., a computer system described in FIG. 5.

Figure 2:
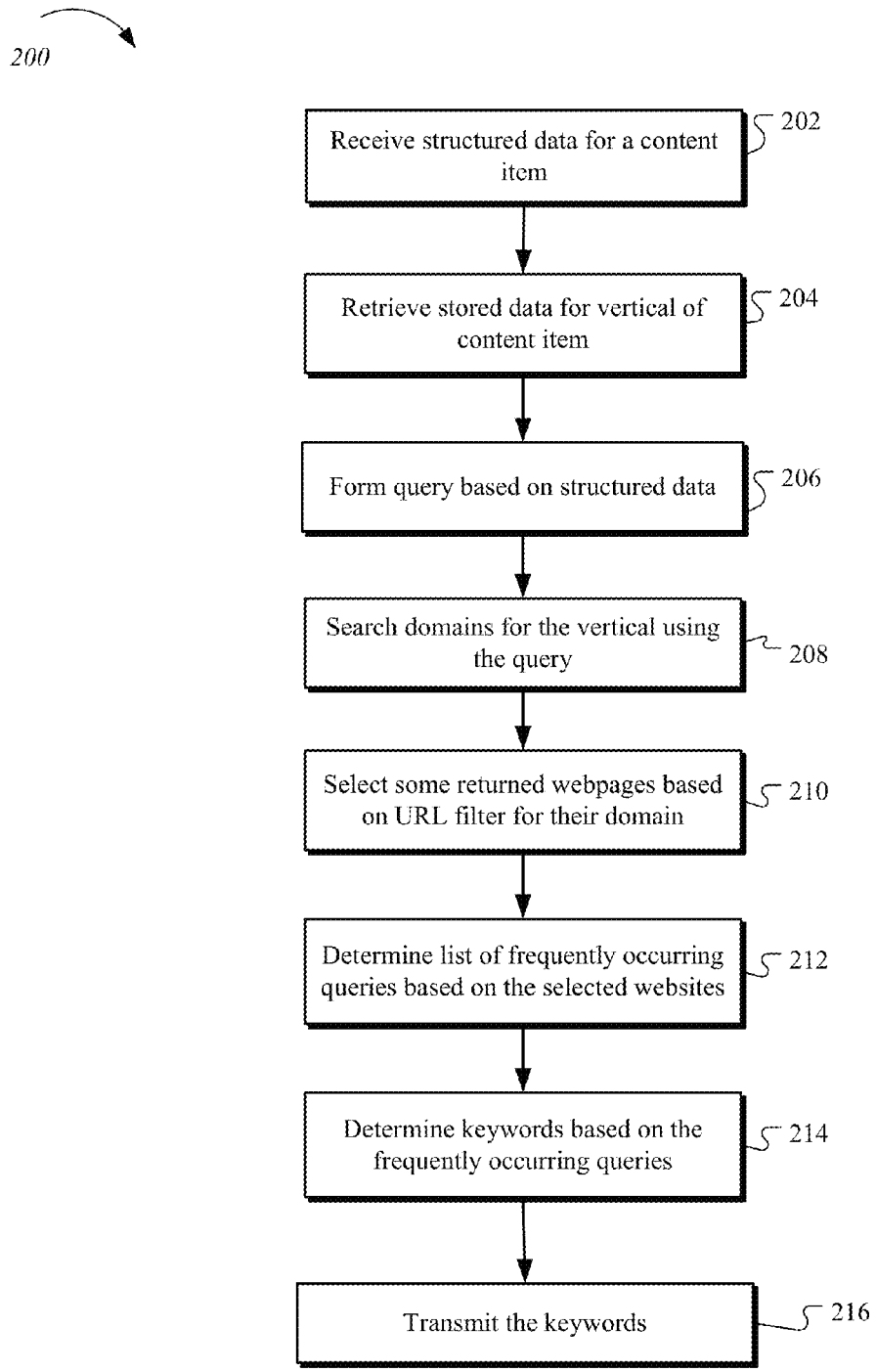
FIG. 2 is a flow chart of an example process for generating keywords for a content item based on structured data and vertical specific domains.

FIG. 2 is a flow chart of an example process 200 for generating keywords for a content item based on structured data and vertical information. Structured data for a content item (e.g., an advertisement) is received that indicates which vertical (e.g., movies or video games) the content item is in. Stored data is retrieved that reflects vertical specific information, including a list of internet domains likely to host webpages with relevant information on topics within the vertical (e.g. the domain for a popular video game review website for a video game vertical). A query is formed based on the data elements (e.g., a movie title and a movie release date) from the structured data for the content item and the query is used to search the specified domains for relevant webpages. The webpages identified as relevant are used along with a collection of search query and result data to determine a list of frequently occurring queries that lead to these webpages. These frequently occurring queries are then used to generate keywords, which may be used to determine allocation scores for the content item in a future impression and select the content item for presentation to a user.

The process 200 can be implemented, for example, by the keyword generation module 120 in the advertisement management system 110 of FIG. 1. In some implementations, the advertisement management system 110 is a data processing apparatus that includes one or more processors that are configured to perform actions of the process 200. For example, the data processing apparatus may be the apparatus 500 described in FIG. 5. In some implementations, a non-transitory computer readable storage medium can include instructions that when executed by a computing device (e.g., a computer system) cause the device to perform actions of the process 200.

According to process 200, structured data for a content item is received 202. For example, the structured data may be received 202 through a network interface of the advertisement management system 110 from an advertiser 108 that seeks to have the content item (e.g., an advertisement) presented to interested users in impressions. In some implementations, the structured data for the content item includes a data element that indicates a vertical (e.g., movies, TV shows, video games, automobiles, appliances, etc.) for the content item. For example, a data element specifying the vertical may be encoded by an advertiser 108 when the content item is created. In some implementations, the vertical for a content item may be automatically determined based on a collection of data elements in the structured data that collectively indicate a vertical. For example, it is possible that one or a combination of several of the descriptions for data elements in structured data for content items within a vertical are characteristic of or unique to that particular vertical (e.g., "box office revenue" may be a data element description that is unique to content items in the movie vertical). The descriptions for these data elements may be analyzed to determine the vertical for a content item, even where no individual data element explicitly identifies the vertical through its value.

Stored data for the vertical of the content item is retrieved 204. In some examples, the stored data includes information specific to the vertical. For example, the stored data may include a list of internet domains that are likely to have webpages reflecting topics in the vertical. The stored data may also include domain specific Uniform Resource Locator (URL) filters that can be used to identify webpages that are focused on a topic within the vertical. In some implementations, the stored data includes one or more query templates that are tailored to the vertical or one or more keyword templates that are tailored to the vertical. In some implementations, the stored data is read from memory or some other local data storage device. For example, the keyword generation module 120 may retrieve 204 stored data for a vertical from the data store 119. In some implementations, the stored data for the vertical may be retrieved 204 from a remote data storage device. For example, the stored data for the vertical may be received through a network interface of the advertising management system 110.

A query is formed 206 based on the structured data for the content item. One or more data elements from the structured data may be cast as text and added to a query for a search engine (e.g., page rank algorithm based search engine). For example, a query for a content item reflecting the movie, "Funny Story" may be formed by combining text from the title and release date data elements from the structured data, resulting in the query: Funny Story 2013. In some implementations, query templates from the stored data for the vertical may be used to augment the query. For example, a query template for the movie vertical may append the word "movie" or "film" to a query. In the "Funny Story" example, this could result in the query: Funny Story 2013 movie. Other search query formats and operators may be used. For example, the query may be formed 206 by the keyword generation module 120 of the advertisement management system 110.

Domains from the list of domains for the vertical are searched 208 using the query to find relevant webpages and other content within those domains. For example, with some search engines, this may be accomplished using a domain operator with the search query passed to the search engine, e.g., query: (site:domain_name) Funny Story 2013 movie. The results of the searches for the list of domains may include relevance scores and the webpages returned may be ranked based on their relevance scores. A set of relevant webpages may be selected from the search results based on the relevance scores. In some implementations, only webpages with relevance scores exceeding a threshold are selected as relevant webpages.

In some implementations, the number of relevant webpages selected from each domain may be limited. For example, it may be that a domain that hosts video game review webpages has a single review page dedicated to each game and additional pages that mention a particular game or related information (e.g., webpages for best games lists, or webpages for other games in the same series) but are not focused on the topic of the particular game to the same extent. It may be advantageous to select only the most relevant page, which is most likely to be the dedicated review page for the particular game that is the topic of a content item. For example, the number of relevant webpages from this game review domain may be limited to one. Other numbers of relevant webpages can be used as the limit for other domains, as suited to those domains. A domain webpage limit may be stored as a parameter associated with the domain in the stored data for the vertical. In some implementations, no limit is placed on the number of relevant webpages to be selected from a particular domain.

For example, the domains may be searched 208 by the keyword generation module 120 of the advertisement management system 110. In some implementations, the keyword generation module may search 208 by passing a query to a remote search system 112 that implements a search engine. For example, the query may be passed to the search engine using a network interface of the advertisement management system 110.

List of relevant webpages may be further refined by applying a URL filter for a domain to search results form that domain to select 210 relevant webpages. In some implementations, the URL filter is stored as a regular expression associated with the domain in the stored data for the vertical. For example, a movie database website, may have a primary webpage dedicated to each movie and additional pages that mention a particular movie or related information (e.g., webpages for best movie lists or webpages for actors with filmographies) but are not focused on the topic of the particular movie to the same extent. URLs in the domain for primary webpages dedicated to particular movies may conform to a particular format that identifies them as primary movie pages. A URL filter may be applied to the search results to select only webpages conforming to this URL format. In some cases, webpages within the domain of less interest (e.g., a best movies list) may have URLs that conform to a particular format. In some implementations, a URL filter may be applied to identify and remove webpages with URLs conforming to this format from the search results as part of the process of selecting the relevant webpages.

For example, the relevant webpages may be selected 210 by the keyword generation module 120 of the advertisement management system 110.

A list of frequently occurring queries that are relevant to the topic may be determined 212 based on the relevant websites that have been selected. Queries may be derived from the relevant webpages by analyzing logs of user search queries (e.g., anonymized search query logs) to find a search queries that have one of these relevant webpages in the top few results and had a good query volume over a population of users. In some implementations, search data reflecting user search queries that were submitted within a widow of time (e.g., a day, a week, or a month) and corresponding search results for those queries are retrieved. For example, the search data may be read for a local storage device (e.g., data store 119) or received from a remote search system 112. A count of the search results corresponding to a query that includes one of the relevant webpages may be determined. In some implementations, only search results that include one of the relevant webpages in the top N links within the search result are counted, where N is a stored parameter set to an integer value (e.g., 1, 5, 10, or 20). The search queries may be ranked based on these counts. A query may be selected for inclusion in the list of frequently occurring queries based on its count. In some implementations, only queries with counts that exceed a threshold are selected for inclusion on the list of queries. The threshold may be determined in a variety of ways. For example, the threshold may be determined as a minimum count of impressions that would contribute appreciably to revenue (e.g., less than 10 impressions a day is unlikely to generate more than a few hundred dollars per year). In some implementations, queries with the highest counts may be added to the list until a particular percentage of the total count across all relevant queries in the window of data is included. For example, if there were five queries that get 100, 50, 25, 15, 10, impressions per day respectively, then only the first 2 keywords would be needed to get a coverage of 75%. To get 95% coverage, all but the last keyword would be needed. In some implementations, queries are selected for the list based on their count based rank (e.g., the top 5 or 10 queries may be selected). Combinations of these approaches for query selection may also be used.

For example, the list of frequently occurring queries may be determined 212 by the keyword generation module 120 of the advertisement management system 110.

Keywords for the content item may be determined 214 based on queries from the list of frequently occurring queries. In some implementations, individual queries from the list are selected as keywords. In some implementations, multiple queries from the list may combined (e.g., concatenated) to form a keyword. In some implementations, keyword templates from the stored data for the vertical may be used to augment a keyword based on one or more queries from the list of frequently occurring queries. For example, a keyword template for the video games vertical may append the word "walkthrough" or "download" to a query to form the keyword. For example, the keywords may be determined 214 by the keyword generation module 120 of the advertisement management system 110.

The determined keywords may be transmitted 216 or stored for future use in the selection of the content item for presentation to a user. For example, the keywords may be transmitted through a network interface of the advertisement management system 110 to an advertiser 108 that submitted the content item or to an advertisement network. In some implementations, the keywords may be stored as part of the structured data for the content item. For example, the keywords may be written to a structured data record for the content item in the data store 119.

Figure 3:
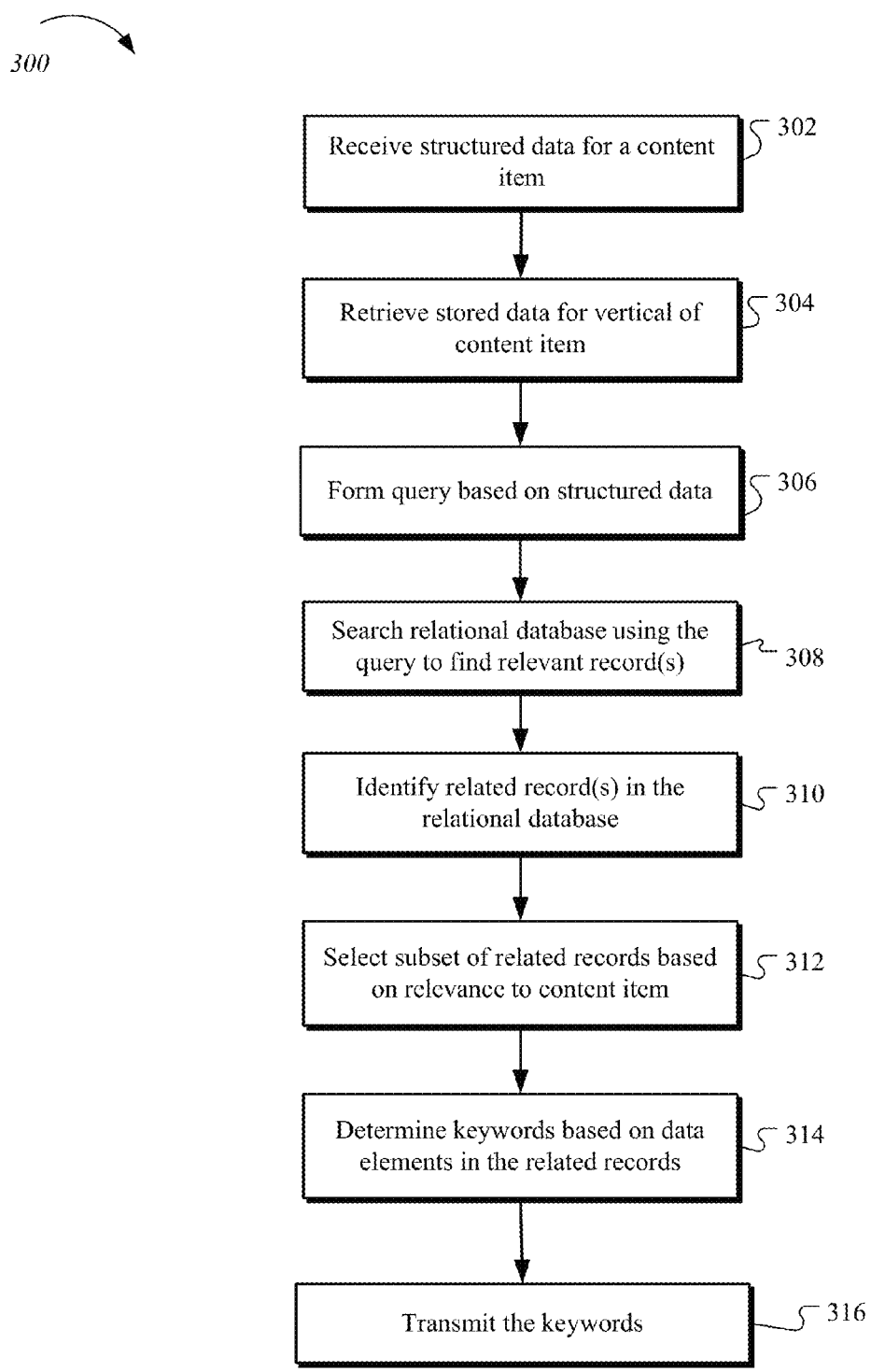
FIG. 3 is a flow chart of an example process for generating keywords for a content item based on structured data and vertical specific relationships.

FIG. 3 is a flow chart of an example process 300 for generating keywords for a content item based on structured data and vertical specific relationships. Structured data for a content item (e.g., an advertisement) is received that indicates which vertical (e.g., movies or video games) the content item is in. Stored data is retrieved that reflects vertical specific information, including a list of relationship types for topics within the vertical (e.g., an "actor appearing in" relationship type for a movie vertical). A query is formed based on the data elements (e.g., a movie title and a movie release date) from the structured data for the content item and the query is used to search a relational database for relevant records. The relationship type(s) are then applied to records identified as relevant to determine a list of related records (e.g., actor records for actors appearing in a movie corresponding to a relevant record). Data elements from these related records are then used to generate keywords, which may be used to determine allocation scores for the content item in a future impression and select the content item for presentation to a user.

The process 300 can be implemented, for example, by the keyword generation module 120 in the advertisement management system 110 of FIG. 1. In some implementations, the advertisement management system 110 is a data processing apparatus that includes one or more processors that are configured to perform actions of the process 300. For example, the data processing apparatus may be the apparatus 500 described in FIG. 5. In some implementations, a non-transitory computer readable storage medium can include instructions that when executed by a computing device (e.g., a computer system) cause the device to perform actions of the process 300.

According to process 300, structured data for a content item is received 302. For example, the structured data may be received 302 through a network interface of the advertisement management system 110 from an advertiser 108 that seeks to have the content item (e.g., an advertisement) presented to interested users in impressions. In some implementations, the structured data for the content item includes a data element that indicates a vertical (e.g., movies, TV shows, video games, automobiles, appliances, etc.) for the content item. For example, a data element specifying the vertical may be encoded by an advertiser 108 when the content item is created. In some implementations, the vertical for a content item may be automatically determined based on a collection of data elements in the structured data that collectively indicate a vertical.

Stored data for the vertical of the content item is retrieved 304. The stored data includes information specific to the vertical. For example, the stored data may include a list of relationship types that connect topics in the vertical to related topics. In some implementations, the stored data includes one or more query templates that are tailored to the vertical or one or more keyword templates that are tailored to the vertical. In some implementations, the stored data is read from memory or some other local data storage device. For example, the keyword generation module 120 may retrieve 304 stored data for a vertical from the data store 119. In some implementations, the stored data for the vertical may be retrieved 304 from a remote data storage device. For example, the stored data for the vertical may be received through a network interface of the advertising management system 110.

A query is formed 306 based on the structured data for the content item. In some implementations, data elements from the stored data are used to form a query that matches particular values of data elements in data based records to those for data elements from the stored data for the content item. For example, a query for a content item in the movie vertical could take the form:

SELECT Id from myTable WHERE Topic="film" AND Title="Funny Story" AND Release_Year=2013;

In some implementations, one or more data elements from the structured data may be cast as text and added to a query for a search engine (e.g., page rank algorithm based search engine) that may be applied as an unstructured query to the database. For example, a query for the a content item reflecting the movie, "Funny Story" may be formed by combining text from the title and release date data elements from the structured data, resulting in the query: Funny Story 2013. In some implementations, query templates from the stored data for the vertical may be used to augment the query. For example, a query template for the movie vertical may append the word "movie" or "film" to a query. In the "Funny story example, this could result in the query: Funny Story 2013 movie. Other search query formats and operators may be used. In some implementations, a data base query may be formed as a combination of structured and unstructured terms.

For example, the query may be formed 306 by the keyword generation module 120 of the advertisement management system 110.

A relational database is searched 308 using the query to find relevant records. The results of the search may include relevance scores and the records returned may be ranked based on their relevance scores. A set of one or more relevant records may be selected from the search results based on the relevance scores. In some implementations, only records with relevance scores exceeding a threshold are selected as relevant records.

In some implementations, the number of relevant records selected may be limited. In some implementations, a single relevant record is selected. Limiting to one relevant record may be especially advantageous were the relational data base is guaranteed or likely to have a single record that is primarily focused on each topic that content items are expected to reflect. For example, were the topics are various products with unique stock-keeping unit (SKU) numbers and the relational database has corresponding unique records. In these cases, it is likely that the search will return this most relevant record. A limit on the number of relevant records may be stored as a parameter in the stored data for the vertical. In some implementations, no limit is placed on the number of relevant records to be selected.

For example, the domains may be searched 308 by the keyword generation module 120 of the advertisement management system 110. In some implementations, the keyword generation module may search 308 by passing a query to a remote relational data base server 132 that implements a search engine for the relational database 130. For example the query may be passed to the search engine using a network interface of the advertisement management system 110.

The relational database may then be queried to identify 310 records related to the relevant records in ways specific to the vertical. In some implementations, a list of data elements in a relevant record is determined, where the data elements in the list each point to other related records reflecting a topic that shares a vertical specific relationship with the topic of the relevant record. For example, a record for the movie "Funny Story" may include multiple data elements of type "actor appearing in" that match an "actor appearing in" relationship type stored in the stored data for a movie vertical. Each of these data elements may include a link or other pointer to a record in the relational database for the actor with additional information about that actor. For example, the actor record may include the actor's name, a list of their films, a studio affiliation, and an age, among other things.

For example, the related records may be identified 310 by the keyword generation module 120 of the advertisement management system 110.

A subset of the related records may be selected 312 based on an estimate of the relevance of each related record to the content item. A relevance score may be determined for each related record that has been identified. In some implementations, a corpus of webpages is analyzed to determine a number of webpages within which one or more terms from the structured data for the content item co-occur with one or more terms from the related record. The relevance score for the related record may be based on the number of such webpages in the corpus. The relevance score may also be based on the number of terms that co-occur in each of these webpages. In some implementations, a corpus of sets of related search queries (e.g., queries entered by a single anonymous user or search queries submitted within a short period of time) is analyzed to determine a number of sets of related queries within which one or more terms from the structured data for the content item co-occur with one or more terms from the related record. The relevance score for the related record may be based on the number of such sets of queries in the corpus. The relevance score may also be based on the number of terms that co-occur in each of these sets of queries. A set of related queries may include one or more queries. In some implementations, the relational data base itself may be analyzed to determine relevance scores for related records. For example, if there are two actors in a movie, and one actor only stars in that movie and the other stars in hundreds of other movies, then the first actor may be more related to the topic of interest. Also, if the same person has several roles in the movie (e.g., actor and director), that person may be more related than either a director or an actor typically is.

For example, the subset of related records may be selected 312 by the keyword generation module 120 of the advertisement management system 110.

Keywords for the content item may be determined 314 based on data elements in the related records. In some implementations, individual queries data elements (e.g., an actor's name) are selected as keywords. In some implementations, multiple data elements (e.g., actor's name and movie studio affiliation) from a related record may be combined (e.g., concatenated) to form a keyword. In some implementations, data elements form multiple related records (e.g., multiple actor names or actor names and director name) may be combined to form a keyword. In some implementations, keyword templates from the stored data for the vertical may be used to augment a keyword based on one or more queries from the list of frequently occurring queries. For example, a keyword template for the video games vertical may append the word "walkthrough" or "download" to a query to form the keyword. For example, the keywords may be determined 314 by the keyword generation module 120 of the advertisement management system 110.

The determined keywords may be transmitted 316 or stored for future use in the selection of the content item for presentation to a user. For example, the keywords may be transmitted through a network interface of the advertisement management system 110 to an advertiser 108 that submitted the content item or to an advertisement network. In some implementations, the keywords may be stored as part of the structured data for the content item. For example, the keywords may be written to a structured data record for the content item in the data store 119.

Figure 4:
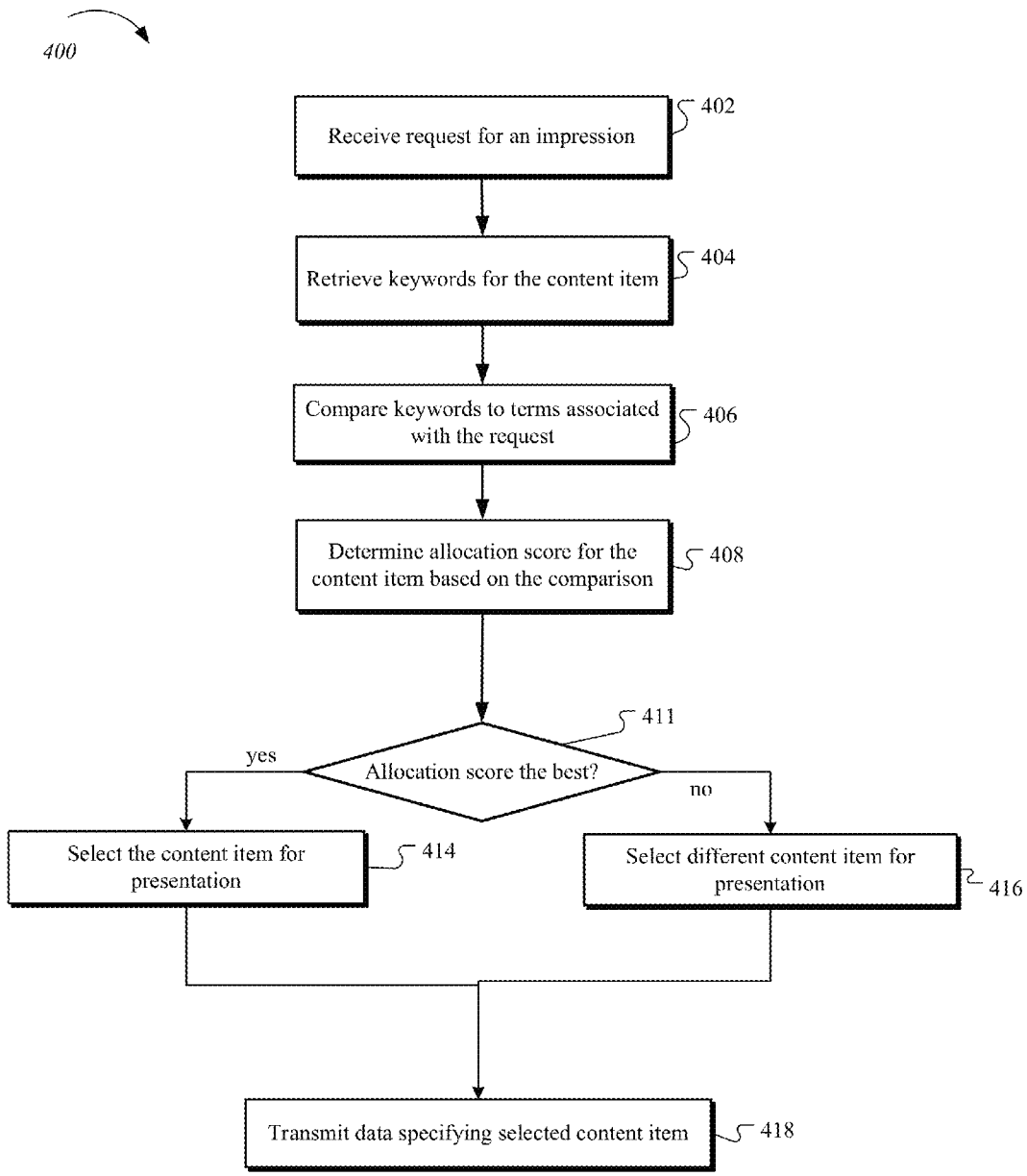
FIG. 4 is a flow chart of an example process for selecting a content item for presentation in response to a user request.

FIG. 4 is a flow chart of an example process 400 for selecting a content item for presentation in response to a user request. A request for an impression is received. Keywords for a content item are retrieved and used to evaluate whether the content item should be presented in response to the request. The keywords are compared to terms associated with the request and an allocation score for the content item is determined based on the comparison. The resulting allocation score may then be compared to allocation scores for other candidate content items. If the content item has the best allocation score it is selected for presentation to the user and data specifying the content item is transmitted in response to the request. Otherwise a different content item is selected and transmitted.

The process 400 can be implemented, for example, by an impression allocation module in the advertisement management system 110 of FIG. 1. In some implementations, the advertisement management system 110 is a data processing apparatus that includes one or more processors that are configured to perform actions of the process 400. For example, the data processing apparatus may be the apparatus 500 described in FIG. 5. In some implementations, a non-transitory computer readable storage medium can include instructions that when executed by a computing device (e.g., a computer system) cause the device to perform actions of the process 400.

According to process 400, a request for an impression is received 402. The impression may be associated with a user request for an online resource (e.g., a website resource 105 or a search result 118) that includes a content slot. The impression is associated with terms relating to the user request. For example, the impression may be associated with terms occurring in a website resource 105 or with terms occurring in a query 116 that was submitted to request a search result. In some implementations, the request for an impression is received through a network interface of the advertisement management system 110 from an online resource provider (e.g., a website 104 or search system 112) or from a user device 106.

Keywords for a content item are retrieved 404. The keywords may be derived from structured data for the content item that indicates a vertical for the content item as well as vertical specific information. For example, the keywords may have been generated using process 200 of FIG. 2 and/or they may have been generated using process 300 of FIG. 3. For example, an impression allocation module in the advertisement management system 110 may retrieve 404 keywords for a content item from the data store 119. In some implementations, the keywords for the content item may be retrieved 404 from a remote data storage device. For example, the keywords for the content item may be received through a network interface of the advertising management system 110. In some implementations, the keywords for the content item may be retrieved 404 by causing the keyword generation module 120 to generate keywords in real time in response to the request for an impression and return the keywords.

The keywords for the content item are compared 406 to terms associated with the request for an impression. An allocation score is determined 408 based at least in part on matches between the keywords and the terms. In some implementations, the allocation score is a prediction of chance of conversion if the content item is served in the impression (e.g., a predicted click through rate). For example, the keywords may be compared 406 to the terms and the allocation score for the content item may be determined 408 by an impression allocation module of the advertisement management system 110.

The allocation score for the content item may be compared 411 to allocation scores for other candidate content items. If the content item has the best available allocation score, then the content may be selected 414 for presentation to a user in the impression. Otherwise, a different content item may be selected 416 for presentation to a user in the impression. For example, the allocation scores may be compared 411 and a content item may be selected 414 by an impression allocation module of the advertisement management system 110.

Data specifying the selected content item may be transmitted 418 in response to the request for an impression. In some implementations, the data specifying the content is link that redirects a user device 106 to an advertiser device 108 that serves the content item. In some implementations, the selected content item can be provided to a user device that requested an online resource with which the content item is being provided. The content item may be provided to the user device 106, for example, over content delivery network 102. The content item may be provided with presentation instructions that specify a content slot in which the content item is to be presented. In turn, the content item can be presented on a user device 106 according to the presentation instructions. For example, data specifying the selected content item may be transmitted 418 through a network interface of the advertisement management system 110.

FIG. 5 shows an example of a generic computer device 500 and a generic mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method performed by one or more processing devices, the method comprising:
receiving structured data describing a content item, the structured data including one or more data elements comprising one or more descriptions and values for the one or more data elements, the structured data indicating a category for the content item;
retrieving stored data for the category, the stored data identifying one or more domains;
forming a first query based on data elements in the structured data;
searching one or more of the domains, using the first query, to identify resources associated with the one or more domains;
determining one or more queries based on data reflecting past search queries, where each of the one or more queries resulted in one or more of the resources being returned as part of a search result;
determining keywords based on the one or more queries;
transmitting or storing the keywords for use in impression allocation decisions;
determining an allocation score for the content item based at least in part on comparison of the keywords to a term associated with a request for an impression, where the allocation score is used to determine whether the content item will be selected for the impression;
selecting the content item for display in response to the request, based on the allocation score; and
transmitting data specifying the content item in response to the request.

2. The method of claim 1, further comprising selecting a subset of the resources based on a URL filter in the stored data for the category.

3. The method of claim 1, in which the resources are each assigned a score and only resources with scores better than a threshold score are used to determine the one or more queries.

4. The method of claim 1, in which at most one resource from each domain in the one or more domains is used to determine the one or more queries.

5. The method of claim 1, in which determining the one or more queries comprises:
retrieving search data reflecting user search queries that were submitted within a window of time and corresponding search results for those queries;
determining a count of the search results corresponding to a query, the search results including one of the identified resources; and
selecting the query for inclusion in the one or more queries based on the count.

6. The method of claim 1, in which determining the keywords comprises appending terms from the stored data for the category to a query from the one or more queries.

7. A system comprising:
one or more data processing apparatus; and
memory storing instructions that, when executed by the one or more data processing apparatus, cause the one or more data processing apparatus to perform operations comprising:
receiving structured data describing a content item, the structured data including one or more data elements comprising one or more descriptions and values for the one or more data elements, the structured data indicating a category for the content item;
retrieving stored data for the category, the stored data identifying one or more domains;
forming a first query based on data elements in the structured data;
searching one or more of the domains using the first query to identify resources associated with the one or more domains;
determining one or more queries based on data reflecting past search queries, where each of the one or more queries resulted in one or more of the resources being returned as part of a search result;
determining keywords based on the one or more queries;
transmitting or storing the keywords for use in impression allocation decisions;
determining an allocation score for the content item based at least in part on comparison of the keywords to a term associated with a request for an impression, where the allocation score is used to determine whether the content item will be selected for the impression;
selecting the content item for display in response to the request, based on the allocation score; and
transmitting data specifying the content item in response to the request.

8. The system of claim 7, in which the operations further comprise selecting a subset of the resources based on a URL filter in the stored data for the category.

9. The system of claim 7, in which the resources are each assigned a score and only resources with scores better than a threshold score are used to determine the one or more queries.

10. The system of claim 7, in which at most one resource from each domain in the one or more domains is used to determine the one or more queries.

11. The system of claim 7, in which determining the one or more queries comprises:
retrieving search data reflecting user search queries that were submitted within a window of time and corresponding search results for those queries;
determining a count of the search results corresponding to a query, the search results including one of the identified resources; and
selecting the query for inclusion in the one or more queries based on the count.

12. The system of claim 7, in which determining the keywords comprises appending terms from the stored data for the category to a query from the one or more queries.

13. A system comprising:
a network interface configured to receive structured data describing a content item, the structured data including one or more data elements comprising one or more descriptions and values for the one or more data elements, the structured data indicating a category for the content item;
a data storage device storing stored data for the category, the stored data identifying one or more domains;
a module configured to form a first query based on data elements in the structured data;
a module configured to search at least one of the one or more of the domains using the first query to identify resources associated with the one or more domains;
a module configured to determine one or more queries based on data reflecting past search queries, where each of the one or more queries resulted in one or more of the resources being returned as part of a search result;
a module configured to determine keywords based on the one or more queries;
a module configured to transmit or to store the keywords for use in impression allocation decisions;

a module configured to determine an allocation score for the content item based at least in part on comparison of the keywords to a term associated with a request for an impression, where the allocation score is used to determine whether the content item will be selected for the impression;

a module configured to select the content item for display in response to the request, based on the allocation score; and a network interface configured to transmit data specifying the content item in response to the request.

14. The system of claim 13, comprising a module configured to select a subset of the resources based on a URL filter stored in the stored data for the category.

15. The system of claim 13, in which the resources are each assigned a score and only resources with scores better than a threshold score are used to determine the one or more queries.

16. The system of claim 13, in which at most one resource from each domain in the one or more domains is used to determine the one or more queries.

17. The system of claim 13, in which determining the keywords comprises appending terms from the stored data for the category to a query from the one or more queries.

* * * * *